United States Patent [19]

Helland et al.

[11] Patent Number: 6,134,594
[45] Date of Patent: Oct. 17, 2000

[54] MULTI-USER, MULTIPLE TIER DISTRIBUTED APPLICATION ARCHITECTURE WITH SINGLE-USER ACCESS CONTROL OF MIDDLE TIER OBJECTS

[75] Inventors: Patrick James Helland, Redmond; Rodney Limprecht, Woodinville; Mohsen Al-Ghosein, Issaquah; David R. Reed, Seattle, all of Wash.

[73] Assignee: Microsoft Corporation, Redmond, Wash.

[21] Appl. No.: 08/958,975

[22] Filed: Oct. 28, 1997

[51] Int. Cl.[7] ........................................ G06F 15/16
[52] U.S. Cl. ................... 709/229; 709/201; 709/203; 709/250; 707/102; 707/103; 707/104
[58] Field of Search ..................... 709/200–203, 709/223–225, 229, 250, 300, 303–304; 707/102–104, 201, 10; 713/200–201

[56] References Cited

U.S. PATENT DOCUMENTS

| | | | |
|---|---|---|---|
| 5,619,710 | 4/1997 | Travis, Jr. et al. | 709/203 |
| 5,790,789 | 8/1998 | Suarez | 709/202 |
| 5,857,197 | 1/1999 | Mullins | 707/103 |
| 5,857,201 | 1/1999 | Wright, Jr. et al. | 707/104 |
| 5,864,669 | 1/1999 | Osterman et al. | 709/203 |
| 5,889,942 | 3/1999 | Orenshteyn | 709/229 |
| 5,958,010 | 9/1999 | Agarwal et al. | 709/224 |
| 6,061,796 | 5/2000 | Chen et al. | 709/225 |

*Primary Examiner*—Ahmad F. Matar
*Assistant Examiner*—Bharat Barot
*Attorney, Agent, or Firm*—Klarquist Sparkman Campbell Leigh & Whinston, LLP

[57] ABSTRACT

A multi-tier server application architecture provides a simplified programming model of multiple user server applications that enhances programmer productivity. The multi-tier architecture comprises a client tier for client application code that initiates processing by the server application in response to user input, a middle tier of object-oriented server application code, and a database tier of shared access data and management code. A run-time environment for the object-oriented server application code limits access to instantiated objects of the middle tier server application code to a single one of the users. Objects in the middle tier that are instantiated to initiate processing for a particular user and grouped into a collection. The run-time environment manages the flow of execution into the collection such that the collection has only a single logical thread of execution and access by the client application code is exclusive to the particular user.

18 Claims, 6 Drawing Sheets

MULTI-USER, MULTIPLE TIER DISTRIBUTED APPLICATION ARCHITECTURE WITH SINGLE-USER ACCESS CONTROL OF MIDDLE TIER OBJECTS

FIELD OF THE INVENTION

The present invention relates to a server application-programming model using software components, and more particularly relates to controlling or managing concurrent access by multiple users to a component-based server application.

BACKGROUND AND SUMMARY OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

Because these server applications service a large number of users, the server applications must be programmed to deal with problems of concurrent shared access by multiple users. Shared access by multiple users create a number of well-known problems in correctly synchronizing updates by the users to durable data, isolating processing of one user from that of another, etc. These shared access problems are similar to those faced by users of a joint checking account when one user fails to notify the other of changes to the account balance before a check is written, possibly resulting in an overdraft. For example, a server application for an on-line bookstore faces a shared access problem where two customers concurrently place an order for the same book, and there is only one copy of the book in inventory. If the on-line bookstore application fails to update an inventory database to reflect sale of the book to the first customer before inventory is checked for the second customer's order, then the single book in inventory might be sold to both customers.

A number of concurrency isolation mechanisms for dealing with shared access problems in computer programs are known, including locks, semaphores, condition variables, barriers, joins, and like programming constructs that regulate concurrent access to program code and data. (See, e.g., Tucker Jr., Allen B. (editor), *The Computer Science and Engineering Handbook*, pp. 1662–1665, CRC Press 1997.) However, even with use of these concurrency isolation mechanisms, the task of programming a server application to deal with shared access problems is complex and difficult. Developers of server applications estimate that 30–40% of the development effort is spent on providing infrastructure, including for dealing with shared access problems, as opposed to implementing the business logic of the processing services that the server application is meant to provide. Further, concurrency isolation mechanisms are among the more sophisticated aspects of programming, and typically require the efforts of highly skilled programmers.

By contrast, applications on a single user computing platform are relatively much easier to program. The programmer need not account for shared access problems, and need not implement complex infrastructure to regulate access to code and data by multiple users. Programmers of single user applications thus can concentrate on implementing the "business logic" or data processing services of the application itself. As a result, programmers of single user applications can realize higher productivity, and do not require the added time and expense to acquire the skills necessary to work with sophisticated concurrency isolation mechanisms.

A programming model that is now commonly used in single user computing platforms is object-oriented programming (OOP). In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

Object-oriented programming generally has advantages in ease of programming, extensibility, reuse of code, and integration of software from different vendors and (in some object-oriented programming models) across programming languages. However, object-oriented programming in itself does not solve shared access problems in a multiple user computing system. Thus, when object-oriented programming techniques are used to program server applications, concurrency isolation mechanisms are still needed to regulate shared access of multiple users.

For example, a user of an object typically accomplishes processing work over multiple interactions with the object. First, the user calls member functions through interfaces of the object that set various data properties of the object (also referred to herein as the "data state" of the object). Then, the user calls one or more member functions to initiate processing based on the previously set data properties. If a second user accesses the object between a first user's interactions with the object, the second user can potentially alter the object's data state causing unintended consequences when the first user initiates processing based on the data state.

The present invention simplifies programming of server applications and increases the productivity of server application programmers by providing a multi-tier server application framework that limits access to object-oriented code of the server application to a single user. In the multi-tier framework, program code residing on the users' computers (such as for implementing user interface functions) forms a first tier. The business logic of the server application is implemented in single-user object-oriented code on a middle tier. Shared access program code such as that of a relational database is on a third tier.

By limiting object-oriented server application code to single user access, the multi-tier framework frees server application programmers from multiple user access concerns. The server application programmers can implement the business logic of the server application in a set of object classes, as if for a single user computing platform and without need for complex constructs to address multiple user access concerns. As a result, less programming effort is expended on application infrastructure unrelated to the core business logic of the application. In addition, programmers need not possess advanced or expert skills with mechanisms for regulating multiple user access to be able to program server applications within the multi-tier framework.

In accordance with an aspect of the invention, a run-time service and application integration interfaces provide an execution environment for objects on the server computer(s) that enforces the restriction on access to individual server application objects to just a single user. The run-time service includes object creation or instantiation code that associates each object at the time of its creation into a collection (termed an "activity"), which is exclusive or specific to only one user. The activity is an intrinsic property of the object that cannot be changed during its lifetime. Further, the run-time service tracks the flow of execution through each activity (e.g., calls to objects in the activity), preventing access to the activity by other users as well as any inadvertent parallelism which could corrupt the application state.

Accordingly, all object-oriented code in the server application is subject to the restriction against multiple user access. This further simplifies server application programming in that the programmer is ensured that all code written as objects in the server application will be limited to single user access and belongs on the middle tier of the architecture. Whereas, all non-object oriented code belongs to the third tier of the architecture and may be subject to access from multiple users.

Additionally, since the run-time service ensures exclusive access by a single user to the object-oriented server application code, any data processing that takes place in the object-oriented server application code is assured to be isolated from processing for other users. The programmer therefore is freed to implement business logic of the server application in object-oriented code without providing mechanisms to guard against interference from the server application's processing on other users' behalf.

Further, by allowing only a single logical thread of execution in the activity, the run-time server obviates any need to implement concurrency isolation between threads executing in the server application objects on behalf of even a single user.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

The present invention is directed toward a method and system for simplifying programming of server applications using a multi-tier architecture with single-user object-oriented application code as a middle tier. In one embodiment illustrated herein, the invention is incorporated into an application server execution environment or platform, entitled "Microsoft Transaction Server," marketed by Microsoft Corporation of Redmond, Wash. Briefly described, this software provides a run-time environment and services to support component-based server applications in a distributed network.

Exemplary Operating Environment

Figure 1:
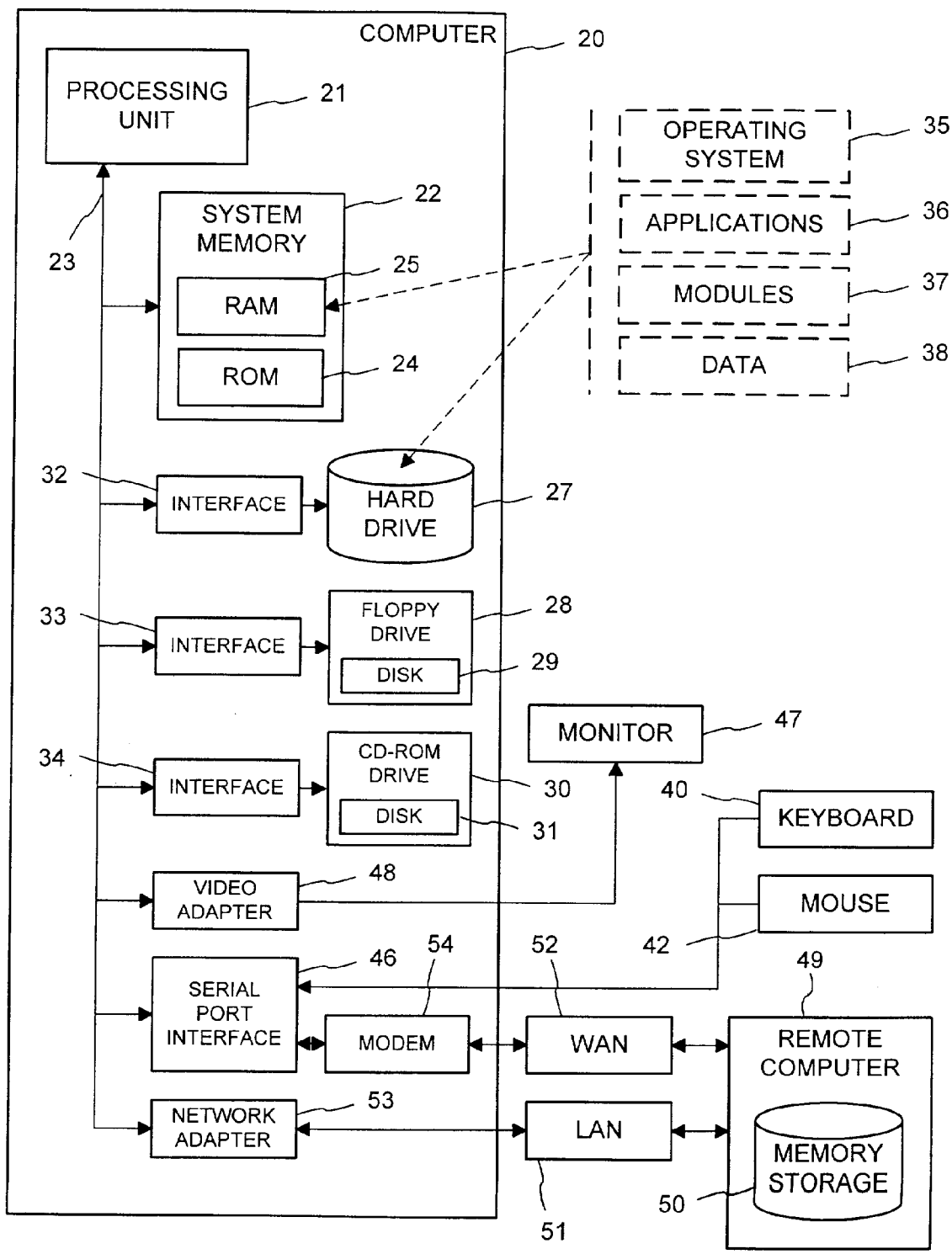
FIG. 1 is a block diagram of a distributed computer system that may be used to implement a method and apparatus embodying the invention for simplifying programming of server applications using a multi-tier architecture with single-user object-oriented application code as a middle tier.

FIG. 1 and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Multi-tier Server Application Architecture

Figure 2:
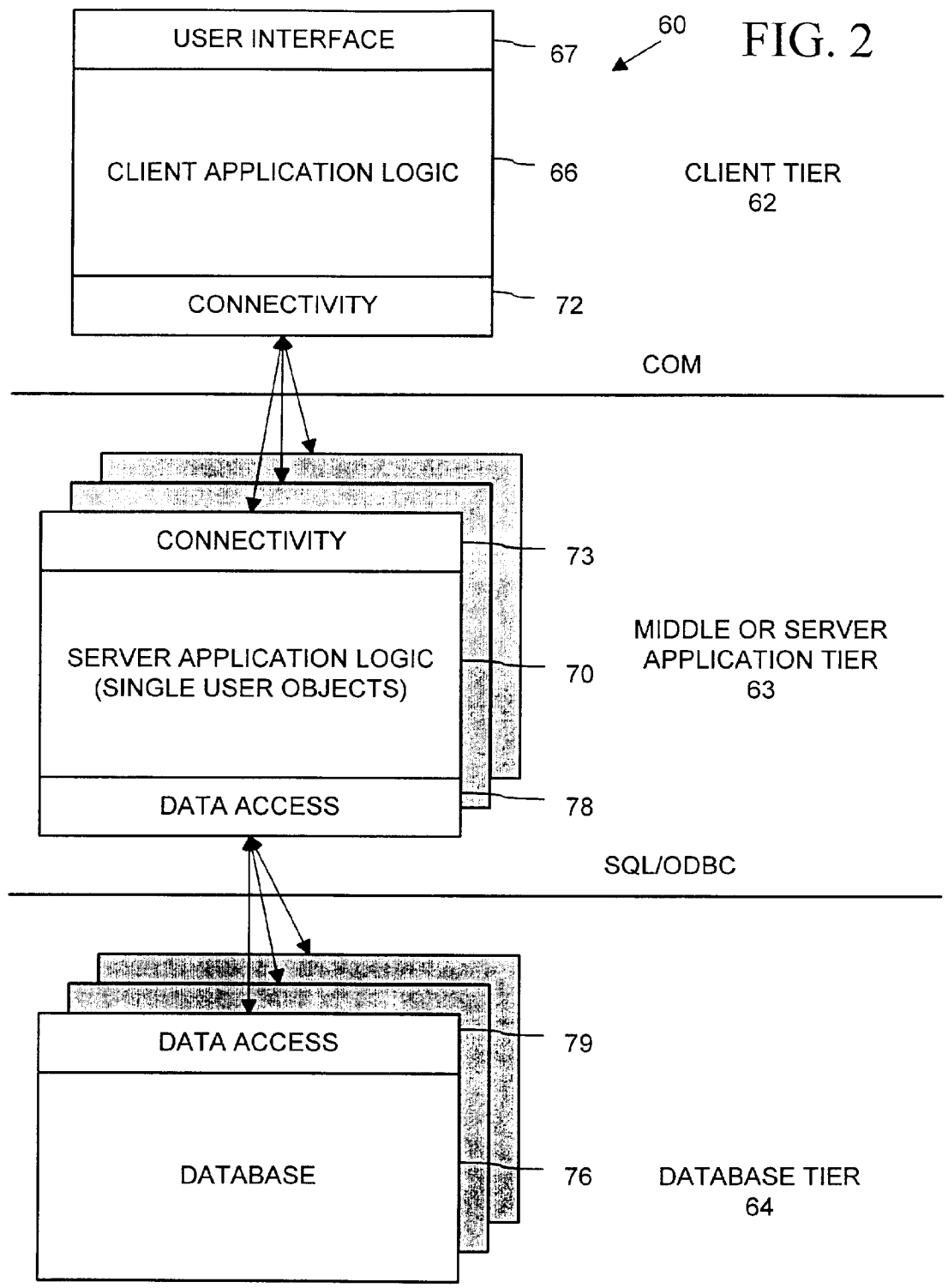
FIG. 2 is a block diagram of a multi-tier server application architecture having a single-user object-oriented application code on a middle tier in accordance with the invention.

With reference to FIG. 2, a multi-tier server application architecture 60 according to an illustrated embodiment of the invention segregates program code of the server application into three tiers, herein termed the client tier 62, the middle or server application tier 63, and the database tier 64. The client tier 62 comprises program code 66 that implements client application (the "client application logic"). Typically, the client application 66 runs on a user's workstation that connects to the server computer 20 (FIG. 1) on a distributed network. The client application 66 also typically implements a user interface 67 which responds to user inputs to initiate processing at the server computer 20.

The server application tier 63 comprises program code 70 that implements the business logic of the server application (hereafter the "server application logic" 70). Typically, the server application runs on the server computer 20 (FIG. 1). The client application 66 communicates with the server application logic 70 using connectivity code 72–73 to initiate processing by the server application for the user. In the illustrated multi-tier architecture 60, the connectivity code 72–73 is the Component Object Model ("COM") protocol of Microsoft Corporation's OLE and ActiveX specifications. In alternative embodiments of the invention, the connectivity code 72–73 can be implemented using other protocols for remotely invoking processing functions of the server application, such as remote procedure calls, message passing, etc.

In accordance with the invention, the server application logic 70 on the server application tier is composed of object-oriented code where access to individual object instances is limited to a single user. More particularly, the server application logic 70 in the illustrated multi-tier architecture 60 is implemented as a set of COM Objects that run in a system provided process under control of a run-time service which limits the objects to single user access. These COM Objects which implement the server application logic 70 are herein referred to as server application components.

Because the server application components on the middle tier 70 are limited to single user access, the programmer need not implement complex programming constructs in the server application components to control shared access by multiple users. The programmer thus can concentrate on implementation of the business logic of the server application in the server application components, rather than the shared access control infrastructure. As a result, the programmer can realize increased productivity by saving the programming effort that otherwise would be expended on providing such infrastructure.

The database tier 64 of the illustrated architecture 60 comprises code and data to which multiple users share access. Typically, this shared access code and data takes the form of a database 76, such as the Microsoft SQL Server relational database management system. The server application components 70 use data access services 78–79 to access data from the database 76. In the illustrated architecture 60, the data access services 78–79 take the form of SQL queries, or database connections conforming to the Microsoft Open Database Connectivity ("ODBC") call level interface. When writing code in the server application architecture for the database tier 64, the programmer must include constructs to account for shared access. However, with the separate middle tier 63 limited to single user access, the programmer can implement all business logic for the server application in single-user object-oriented code that runs in the middle tier 63. In most applications, the server application programmer can configure an existing database for use in the database tier 64, and will not need to implement shared access code for the server application.

Server Application Execution Environment

Figure 3:
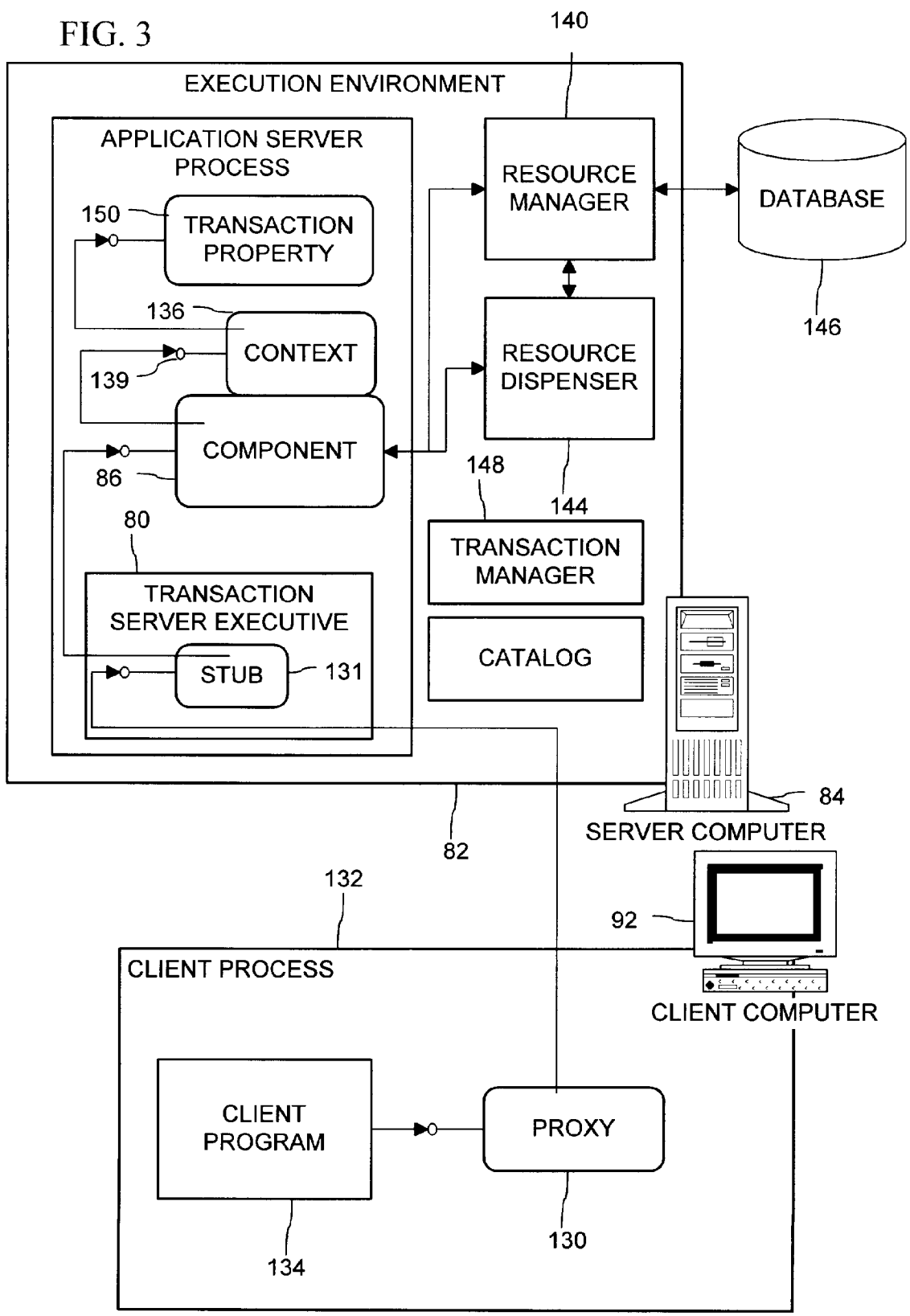
FIG. 3 is a block diagram of a server application component execution environment provided by a server executive on a server computer in the distributed computer system of FIG. 1, that supports the multi-tier server application architecture of FIG. 2.

With reference now to FIG. 3, a transaction server executive 80 provides run-time or system services to create a run-time execution environment 80 on a server computer 84 for the single-user server application components (e.g., server application component 86) that form the server application logic 70 of the middle tier 63 of the multi-tier architecture 60 (FIG. 2). The transaction server executive also provides services for thread and context management to the server application components 86. Included in the services are a set of API functions, including a GetObjectContext and a SafeRef API functions described below.

The illustrated transaction server executive 80 is implemented as a dynamic link library ("DLL"). (A DLL is a well-known executable file format which allows dynamic or run-time linking of executable code into an application program's process.) The transaction server executive 80 is loaded directly into application server processes (e.g., "ASP" 90) that host server application components, and runs transparently in the background of these processes.

The illustrated ASP 90 is a system process that hosts execution of server application components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP. In the illustrated embodiment, server application components are grouped as a package to be run together in one ASP 90 using an administration utility called "the Transaction Server Explorer." This utility provides a graphical user interface for managing attributes associated with server application components, including grouping the components into packages.

In a typical installation shown in FIG. 3, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

Server Application Components

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application.

Figure 4:
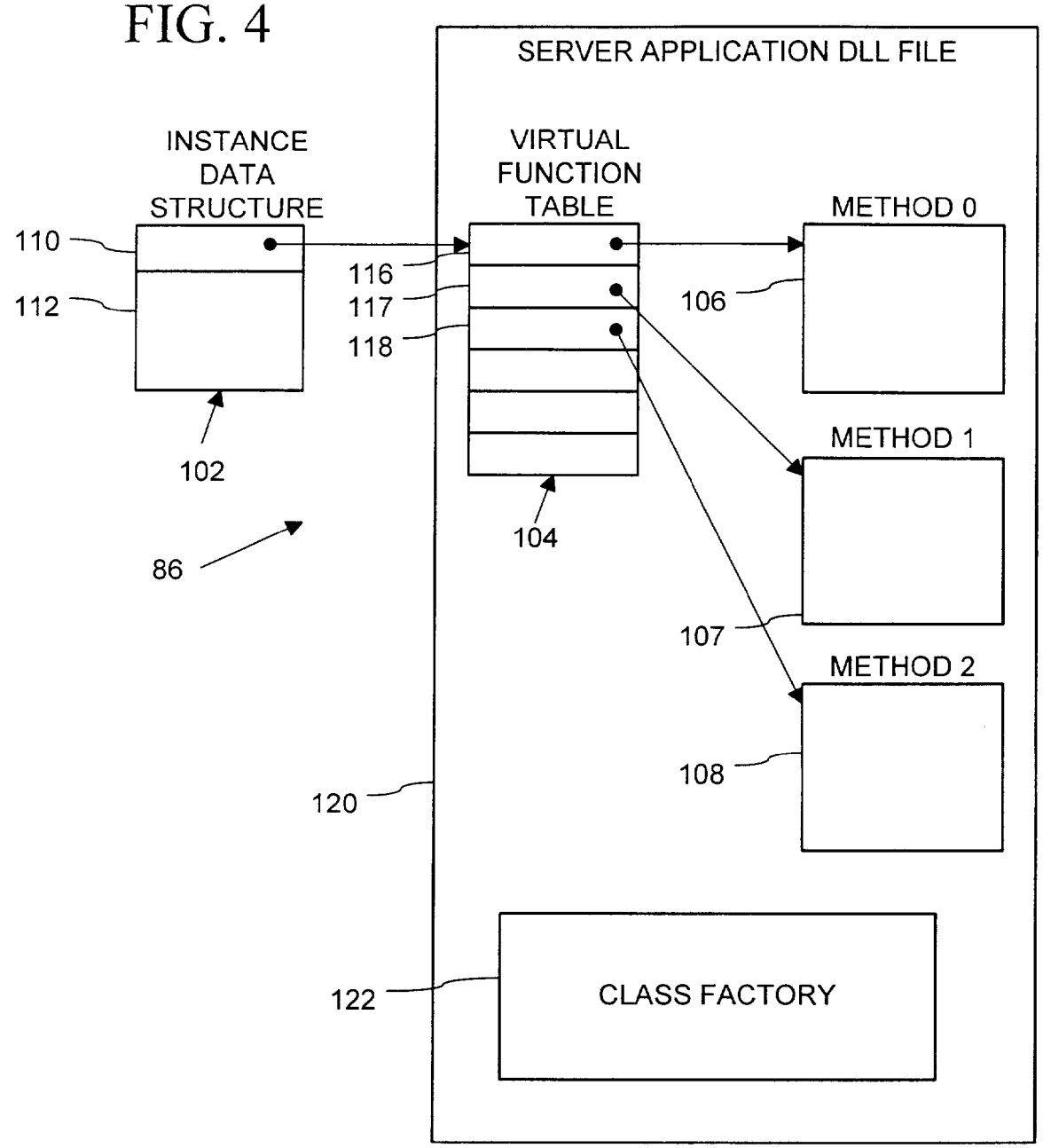
FIG. 4 is a block diagram of the structure of a server application component in the execution environment of FIG. 3.

With reference now to FIG. 4, the server application component 86 (FIG. 3) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

In accordance with COM, the server application component 86 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the component). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the server application component 86. By convention, the interfaces of a COM object are illustrated graphically as a plug-in jack as shown for the server application component 100 in FIG. 3. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName."

The virtual function table 104 and member functions 106–108 of the server application component 86 are provided by a server application program 120 (hereafter "server application DLL") which is stored in the server computer 84 (FIG. 3) as a dynamic link library file (denoted with a ".dll" file name extension). In accordance with COM, the server application DLL 120 includes code for the virtual function table 104 (FIG. 3) and member functions 106–108 (FIG. 3) of the classes that it supports, and also includes a class factory 122 that generates the instance data structure 102 (FIG. 3) for a component of the class.

Like any COM object, the sever application component can maintain internal state (i.e., its instance data structure 102 including data members 112) across multiple interactions with a client (i.e., multiple client program calls to member functions of the component). The server application component that has this behavior is said to be "stateful." The server application component can also be "stateless," which means the component does not hold any intermediate state while waiting for the next call from a client.

In the execution environment 80 of FIG. 3, the server application component 86 is executed under control of the transaction server executive 80 in the ASP 90. The transaction server executive 80 is responsible for loading the server application DLL 300 into the ASP 90 and instantiating the server application component 86 using the class factory 122 as described in more detail below. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 4). (COM objects otherwise alternatively can be implemented in an executable (".exe") file.) Second, the component's DLL file 120 has a standard class factory 122 (i.e., the DLL implements and exports the DllGetClassObject function, and supports the IClassFactory interface). Third, the server application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients," and generally form the client application logic 66 in the client tier 62 of the multi-tier server application architecture 60 (FIG. 2). Alternatively, the client program 134 can be another server application component that also runs under control of the transaction server executive (either in the same or a separate ASP 90) in the middle tier 63 (FIG. 2). The client program 134 can reside on the server computer 84 or on a separate client computer 92 as shown in FIG. 3 (in which case the client computer interacts with the server application component 86 remotely through the proxy object 130).

Before the server application component 86 can execute in the illustrated execution environment 80, the server application component 86 is first installed on the server computer 84. As with any COM object, the server application component 86 is installed by storing the server application DLL file 120 that provides the server application component 86 in data storage accessible by the server computer (typically the hard drive 27, shown in FIG. 1, of the server computer), and registering COM attributes (e.g., class identifier, path and name of the server application DLL file 120, etc. as described below) of the server application component in the system registry. The system registry is a configuration database. In addition to the server application component's COM attributes, the server application is registered in the system registry with a "transaction server execution" attribute indicating that the server application component is run under control of the transaction server executive in the illustrated execution environment 80. In the illustrated embodiment, this attribute has the form shown in the following example registry entry.

HKEY_CLASSES_ROOT\CLSID\{AB077646-E902-11D0-B5BE-00C04FB957D8}\LocalServer32= C:\WINNT\System32\mtx.exe/p:{DA16F24B-2E23-11D1-8116-00C04FC2F9C1}

When the server application component 86 is run in the execution environment 80, the transaction server executive 80 maintains a component context object 138 associated with the server application component 86, including while the server application component 86 is deactivated. The component context object 138 provides context for the execution of the server application component 86 in the execution environment 80. The component context object 138 has a lifetime that is coextensive with that of the server application component. The transaction server executive 80 creates the component context object 138 when the server application component 86 is initially created, and destroys the component context object 138 after the application server component 86 is destroyed (i.e., after the last reference to the application server component is released).

The component context object 138 contains intrinsic properties of the server application component that are determined at the component's creation. These properties include a client id, an activity id, and a transaction reference. The client id refers to the client program 134 that initiated creation of the server application component. The activity id refers to an activity that includes the server application component. An activity is a set of components executing on behalf of a base client, within which only a single logical thread of execution is allowed. The transaction reference indicates a transaction property object 150 that represents a transaction (i.e., an atomic unit of work that is either done in its entirety or not at all) in which the server application component participates. The component context object 138 is implemented as a COM Object that runs under control of the transaction server executive. The component context object 138 provides an "IObjectContext" interface described in more detail below, that has member functions called by the server application component 86.

In the illustrated execution environment, the transaction server executive 80 maintains an implicit association of the component context object 138 to the server application component 86. In other words, the transaction server executive 80 does not pass a reference of the component context object 138 to the client program 134 which uses the server application component 86. Rather, the transaction server executive 80 maintains the component's association with the context object, and accesses the component context object when needed during the client program's access to the server application component 86. Thus, the client program 134 is freed from explicitly referencing the component context object 138 while creating and using the server application component 86.

With reference again to FIG. 3, the server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages non-durable shared state (i.e., without the guarantee of durability) on behalf of the server application components within the ASP 90. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

Overview of COM Object Instantiation in OLE

As with other COM objects, the client program 134 (FIG. 3) must first request creation of an instance of the server application component 86 (FIG. 3) and obtain a reference to the server application component before the client program can access the functionality implemented by the server application component (i.e., before the client program can call member functions supported on an interface of the server application component).

In Microsoft's OLE, a client program instantiates a COM object using services provided by OLE and a set of standard component interfaces defined by COM based on class and interface identifiers assigned to the component's class and interfaces. More specifically, the services are available to client programs as application programming interface (API) functions provided in the COM library, which is part of a component of the Microsoft Windows operating system in a file named "OLE32.DLL." Also in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUID") that the programmer creates with an OLE service named "CoCreateGUID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance," that the client program can call to request creation of a component using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the component using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (such as, an interface pointer) to the COM object. By convention, the IUnknown interface's member functions are included as part of each interface on a COM object. Thus, any interface pointer that the client obtains to an interface of the COM object can be used to call the QueryInterface function.

Creating the Server Application Component

With reference still to FIG. 3, the client program 134 can create the server application component 86 in the illustrated execution environment 80 in any of several ways. First, the client program 134 can create the server application component 86 using the CoCreateInstance API function or an equivalent method based on the CoGetClassObject API function and IClassFactory::CreateInstance function (which are a conventional COM API function and standard COM interface). The CoGetClassObject API function on the server computer 84 returns a reference to a class factory provided in the transaction server executive 80 when the system registry entry for the requested class includes the transaction server execution attribute described above. This allows the transaction server executive to participate in a subsequent call to the IClassFactory::CreateInstance function (such as by the CoCreateInstance API function) since the call is then made to the class factory in the transaction server executive. In response to this call, the implementation of the IClassFactory::CreateInstance function in the transaction server executive's class factory creates the component context object 138 of the server application component 86. The transaction server executive 80 later calls the IClassFactory::CreateInstance function of the class factory 122 in the server application DLL file 120 to create the server application component 86.

When created with this first approach, the properties in the component context object 136 associated with the new server application component 86 are not inherited from the client program that requested its creation. More particularly, the transaction server executive 80 initiates a new activity (described below) and sets the activity id in the new server application component's context to indicate the new activity. The transaction server executive 80 sets the client id in the new component's context to indicate the client program 134 that requested the component's creation. The transaction server executive 80 also initiates a transaction for the new component is one is required. Because of this limitation, the first approach typically is used only for base clients in the client tier 62 to create a server application component on the middle tier 63.

Second, the server application component 86 can be created using the component context object of another component. The component context object provides an IObjectContext::CreateInstance member function which can be called to create other server application components that inherit context from the component context object (i.e., the component context objects created for the new components have the same context properties, including client id, activity id and transaction, as the original component context object). For example, where a "transfer" component and two "account" components implement a money transfer operation in an on-line banking server application, the transfer component may create the two account components for the money transfer operation using its component object context. The account components automatically inherit properties from the transfer component's context and are included in the same transaction as the transfer component. The client program 134 which created the initial transfer component thus has control over the work of all three components under the same transaction property object (i.e., the client program 134 can commit or abort the work as an atomic transaction).

In this second approach, the server application component accesses its component context object using a service of the transaction server executive, called the GetObjectContext API function (described below).

Safe References

When the server application component 86 is created using any of the three above described approaches, the server application component executes in the illustrated execution environment 80 under control of the transaction server executive 80. More specifically, the client program's call to the CoCreateInstance or IObjectContext::CreateInstance functions to initiate creating the server application component returns a reference to the server application component referred to as a "safe reference." References obtained through a call to the server application component's QueryInterface member function (described above) also are returned by the transaction server executive 80 as safe references. Thus, through use of the QueryInterface function, the client program 134 can obtain multiple safe references to various interfaces supported on the server application component. Also, the client program 134 can pass safe references to other client programs and server application components to allow such other clients to also use the server application component 86.

Instead of being a direct pointer to the server application component's instance data structure 102 (FIG. 4) as are object references in COM, safe references refer indirectly to the server application component through the transaction server executive 80. Thus, calls made to the server application component's member functions using a safe reference always pass through the transaction server executive 80. This allows the transaction server executive to manage context switches, and allows the server application component to have a lifetime that is independent of the client program's reference to the component. The transaction server executive 80 tracks usage of all safe references to the server application component 86 through activation and deactivation, such that all safe references consistently refer to the current instance of the server application component when activated. When deactivated, a call using any safe reference to the server application component causes the transaction server executive to activate the server application component.

So as to ensure that all calls are made to the server application component using a safe reference (i.e., so that the calls pass through the transaction server executive 80), the server application component 86 preferably is programmed to not pass to a client or other object any direct reference to itself outside of a QueryInterface call. Instead, the server application component can obtain a safe reference to itself to provide to clients using a SafeRef API function (described below) of the transaction server executive 80.

Activities

As already mentioned, each server application component has, as an intrinsic property stored in its component context object, an association (i.e., activity identifier) to an activity. An activity is a set of server application components executing on behalf of a base client (i.e., a client program that executes outside the execution environment 82, such as in the client tier 62 of the multi-tier architecture 60 of FIG. 2). An activity includes the server application component 86 directly instantiated by the base client (i.e., through a CoCreateInstance, as well as any other server application components that the first instantiated server application component or its descendents may instantiate.

Figure 5:
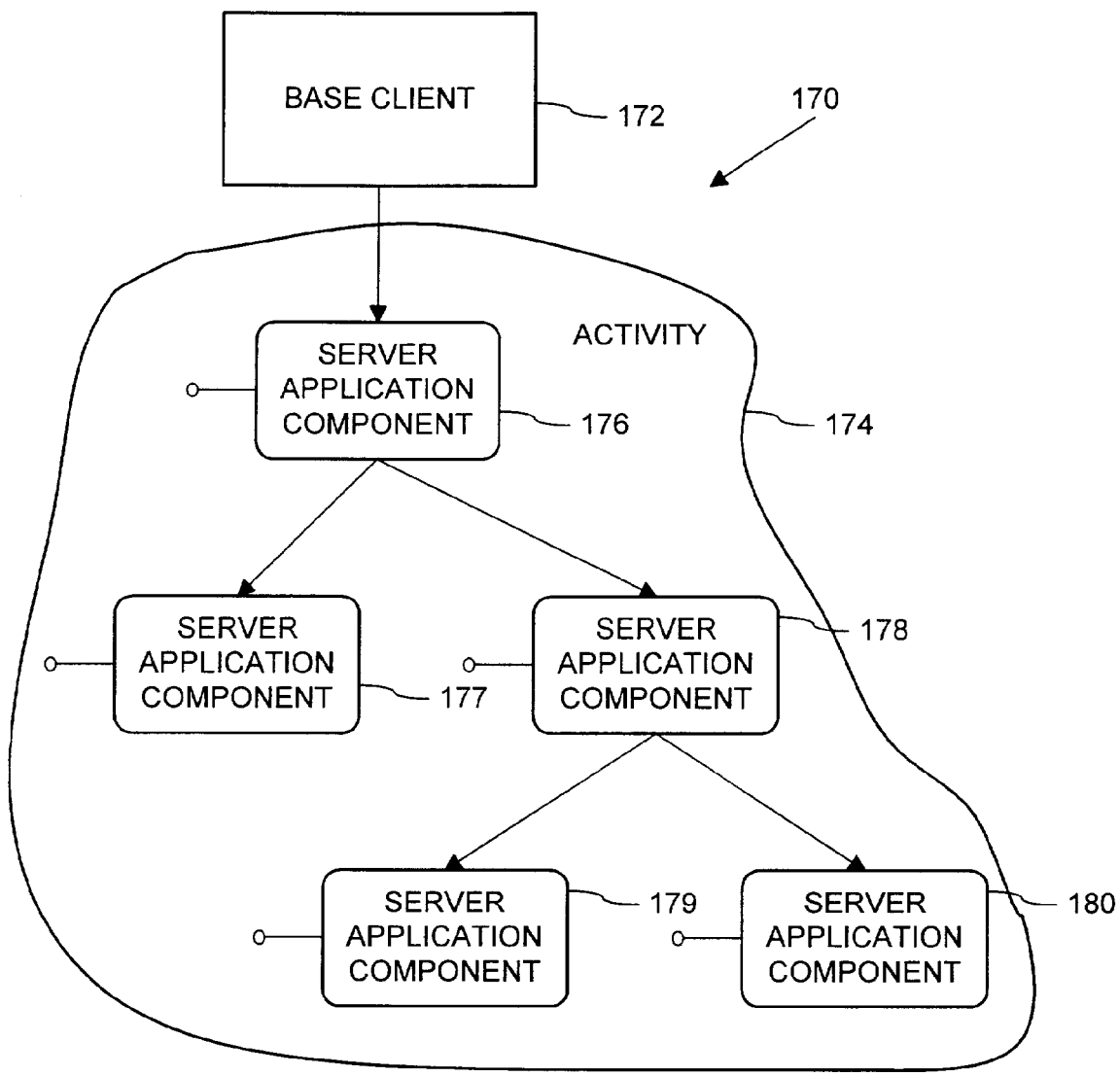
FIG. 5 is a block diagram of an activity involving a plurality of server application components in the execution environment of FIG. 3.

In an exemplary server application 170 shown in FIG. 5 for example, a base client 172 directly instantiates a server application component 176, which for convenience we label the "original ancestor." Upon instantiation, the execution environment 82 associates the original ancestor server application component 176 in an activity 174. The original ancestor server application component 176, in turn, instantiates two other server application components 177–178, labeled "descendents" for convenience, to perform related processing. The descendent server application component 178 also instantiates two additional server application components 179–180. The execution environment 82 also associates the server application components 177–180 in the activity 176. The result is a collection of server application components 176–180 that are directly or indirectly under the control of the base client 172, and all associated in a same activity. Thus, the exemplary server application 170 may be an on-line banking application, in which the original ancestor server application component 176 implements a money transfer and instantiates the descendent server application components 177–178 to process debit and credit updates to the affected accounts. As a further example, the server application 170 may be an on-line bookstore application in which the original ancestor server application component 176 orchestrates a sale of a collection of books. The original ancestor component 176 may use several other descendent components 177–178, such as one to record the order and another to initiate customer billing.

After instantiation, the association of each server application component 176–180 to the activity 174 as an intrinsic property of the server application component maintained in its component context object (e.g., component context object 136 of FIG. 3) cannot be changed. The illustrated execution environment 82 thus maintains an association (called the activity) of a collection of server application components 176–180 engaged in data processing to a particular base client 172 that initiated the processing. In the multi-tier architecture 60 (FIG. 2), the base client 172 is the client application logic 66 of the client tier 62 (FIG. 2). As shown in FIG. 3, the base client 172 runs on a client computer 92 operated by an individual user to provide the user interface through which processing activities by the server application are initiated by user input. Thus, the association of a collection of server application components 176–180 to the base client 172 also is an association to a particular user of the server application.

Upon initiating the activity during creation of the original ancestor server application component 176, the transaction server executive 80 stores the identity of the base client 172 that originated the activity (i.e., by creating the original ancestor server application component) in association with the activity 174.

Restricting Execution in the Activity

Through the mechanism of the safe references described above, the transaction server executive 80 (FIG. 2) is able to track the flow of program execution to each server application component 86, and through each activity 174 (FIG. 5). A safe reference refers to the server application component 86 only indirectly through the transaction server executive 80, which maintains the association of the safe reference to an interface of the server application component 86. Each call made to the server application component 86 using the safe reference thus is passed through the transaction server executive 80.

The transaction server executive 80 (FIG. 3) restricts the flow of execution through the activity 174 (FIG. 5) to allow only a single logical thread to execute in the activity at any one time. A thread is the basic entity to which the operating system allocates processing time on the processing unit 21 (FIG. 1) of the computer. A thread can execute any part of an application's code, including a part currently being executed by another thread. All threads of a process share the virtual address space, global variables, and operating-system resources of the process. (See, e.g., Tucker Jr., Allen B. (editor), The Computer Science and Engineering Handbook, pp. 1662–1665, CRC Press 1997.)

When the base client 172 (FIG. 5) calls into the activity (e.g., to an interface of the original ancestor server application component 176 using a safe reference), the transaction server executive 80 (FIG. 3) allocates a thread to process the call in the activity if no other thread is presently executing in the activity. The transaction server executive 80, however, blocks all subsequent calls into the activity (such as from a separate thread of the base client) until this current thread returns from the base client's initial call. While in the activity, the transaction server executive allows the thread to execute calls between the other server application components 177–180 in the activity. The transaction server executive 80 determines that a call is being made between components in the activity by checking whether a thread making a call to a server application component in the activity has a same thread identifier as the thread currently executing in the activity. If so, the call is being made between the components 176–180 in the activity 174 and is allowed to proceed.

This restriction to a single logical thread protects the server application components 176–180 in the activity from inadvertent parallelism that could corrupt the application state (e.g., the data being processed by the activity). The result is a single, logical thread of execution in a collection of related server application components, that potentially may be distributed on separate server computers. The collection of server application components thus behave as a monolithic application that uses the components on a single thread in the application's process. Such application code is significantly easier to program than code subject to multiple threads of execution.

In some embodiments of the invention, the restriction to a single logical thread within an activity can be limited to those server application components running on a same computer. Where the activity includes server application components on different computers, the transaction server executive on each computer only restricts the server application components of the activity on the respective computer to a single thread. However, simultaneous client calls into the activity to server application components on different computers can result in parallel execution on the different computers. This alternative implementation provides saves some communications bandwidth and processing time of providing full protection against parallelism in a distributed activity.

Although the transaction server executive prevents multiple threads of execution within the activity, reentrancy is possible via a callback. More particularly, a first server application component can pass a self reference when calling a second server application, allowing the second component to call back into the first component. The first server application component must be programmed to receive the callback while waiting for its call to the second component to complete. As the callback is made, the transaction server executive 80 checks the thread identifier associated with the thread making the callback and allows the callback to proceed if the thread identifier matches that of the thread currently executing in the activity.

In addition to restricting the activity to a single thread, the transaction server executive 80 also limits access into the activity to just the base client 172 that originated the activity 174 (i.e., by creating the original ancestor server application component 176). When a call is made into the activity 174, the transaction server executive 80 checks that the identity of the client making the call matches the stored identity of the base client 172 that originated the activity. The call is only allowed to proceed (e.g., by either issuing a thread to process the call in the activity or blocking the call until a currently executing thread returns out of the activity) if the client's identity matches the originating base client 172. By limiting access into the activity to the originating base client, the transaction server executive 80 effectively limits access to each server application component 86 to a single user of the server application. The illustrated execution environment 82 thus prevents interference from other users with the data processing being performed by the server application components for a particular user. This safeguard simplifies the programming of the server application logic 70 in the middle tier of the multi-tier server application architecture 60 (FIG. 2).

Process for Restricting Execution in the Activity

Figure 6:
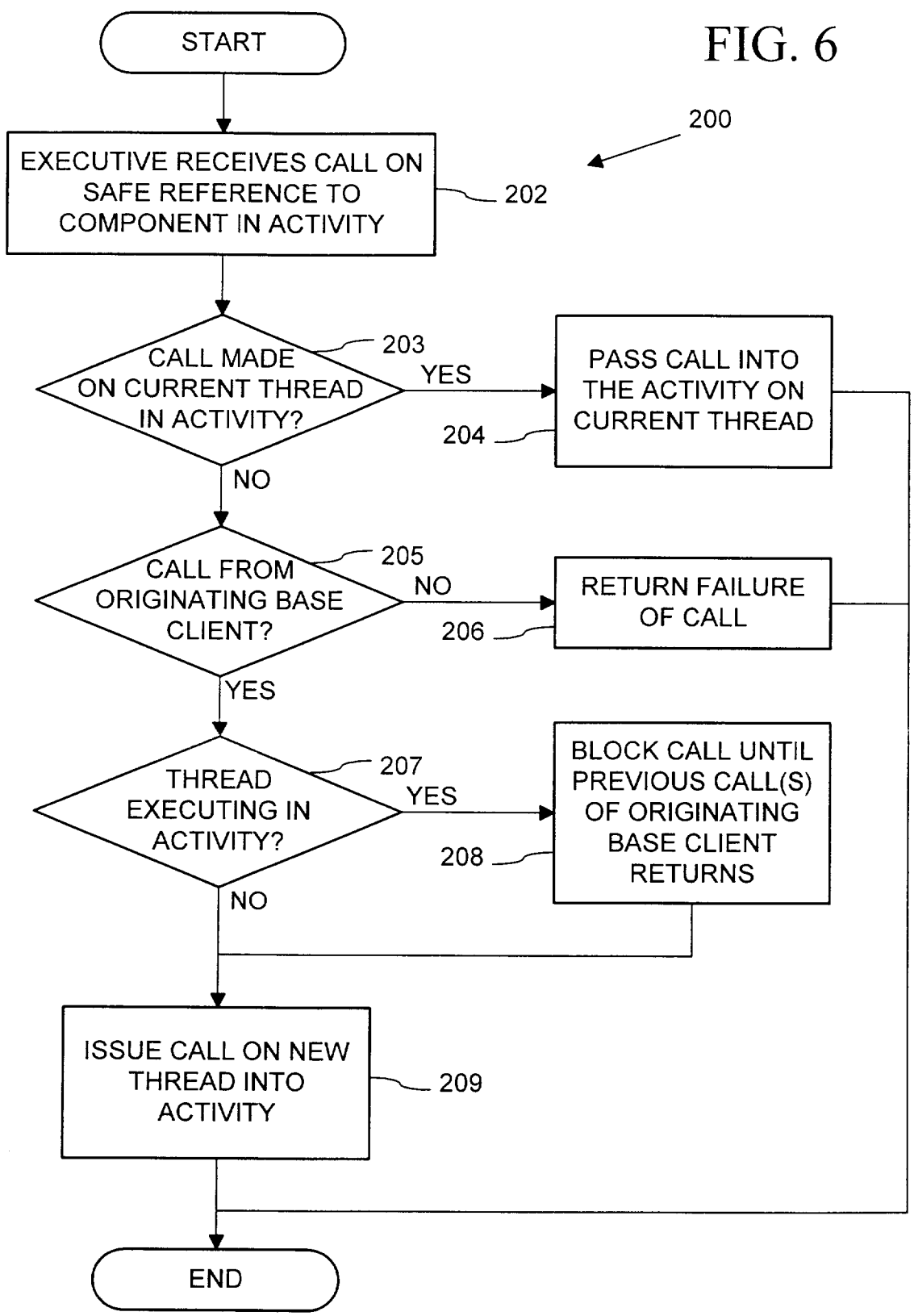
FIG. 6 is a flow chart of a process performed in the execution environment of FIG. 3 to limit access to object-oriented server application code on a middle tier of the multi-tier server application architecture of FIG. 2 to single user access.

With reference to FIG. 6, the transaction server executive 80 (FIG. 2) performs a process 200 to restrict execution in the activity to a single logical thread and to restrict access to server application components in the activity to a single user. As indicated at a step 202, the transaction server executive 80 commences the process 200 upon receiving a call using a safe reference to any of the server application components 176–180 in the activity 174 (FIG. 5).

As indicated at steps 203–204, the transaction server executive 80 (FIG. 3) checks whether the call is made on a thread already executing in the activity 174 (FIG. 5). The transaction server executive 80 compares a logical thread identifier of the thread making the call to that of the thread currently executing in the activity (the "current thread"), if any. If the logical thread identifiers match, the transaction server executive determines that the call is between server application components in the activity. The transaction server executive then passes the call into the activity on the current thread.

Otherwise, if there is no thread currently executing in the activity or thread making the call is not the current thread, the transaction server executive 80 checks at a step 205 whether the call is from the base client 172 (FIG. 5) that originated the activity 174. The transaction serve executive 80 compares the stored identity of the originating base client associated with the activity to the identity of the caller. If the call is not from the originating base client 172, the transaction server executive returns a failure of the call at a step 206.

If the call was from the originating base client 172 of the activity 174, the transaction server executive 80 checks whether there currently is a thread executing in the activity 174 at a step 207. If a thread is already executing in the activity 174, the transaction server executive 80 at a step 208 blocks the call until all previous calls from the originating base client 172 return from the activity 174. If no threads are executing in the activity at step 207 or after all previous calls return, the transaction server executive 80 at a step 209 issues the call into the activity 174 on a new thread (which becomes the "current thread" executing in the activity).

Interfaces and API Functions for Single User Server Application Components

With reference again to FIG. 3, the IObjectContext interface 139 is an interface of the system provided component context object 138. The IObjectContext interface 139 is used by the server application component 86 to create additional server application components, and to participate in the determination of transaction outcomes. The illustrated IObjectContext interface 139 has the following form (in the C programming language):

```
DECLARE_INTERFACE_(IObjectContext, IUnknown)
{
    // IUnknown functions
    HRESULT QueryInterface(THIS_REFIID riid, LPVOID FAR*
        ppvObj);
    ULONG AddRef(THIS);
    ULONG Release(THIS);
    // IObjectContext functions
    HRESULT CreateInstance(THIS_REFCLSID rclsid, REFIID
        riid, LPVOID FAR* ppvObj);
    HRESULT SetComplete(THIS);
    HRESULT SetAbort(THIS);
    HRESULT EnableCommit(THIS);
    HRESULT DisableCommit(THIS);
    BOOL IsInTransaction(THIS);
};
```

The Create Instance function is called by the server application component to create a new server application component with a context (i.e., client, activity and transaction) that is derived or inherited from the calling server application component. In its call, the server application component passes the parameters, "rclsid," "riid," and "ppvObj." The "rclsid" is a class identifier that specifies the new server application component to be created. The "rclsid" parameter is an interface identifier that specifies which interface of the new server application component is to be used by the calling server application component to communicate with the new server application component. The "ppvObj" is a memory location in the calling server application component where a pointer to the specified interface is to be returned. As discussed above, the transaction server executive 80 creates a new component context object to store the context of the new server application component. The properties of the new component context object are inherited from the calling server application component.

TABLE 1

IObjectContext::CreateInstance Return Values

| Value | Description |
| --- | --- |
| S_OK | A safe reference to the object was successfully returned. |
| VIPER_E_MARSHAL | The new server application component supports custom marshaling. |
| VIPER_E_NOTREGISTERED | The specified component is not registered as a viper component. |
| E_SERVERFAIL | A server failure occurred. |
| E_UNEXPECTED | An unexpected error occurred. |

The transaction server executive 80 provides the SafeRef API function for use by the server application component to obtain a safer reference to itself that can be passed to another program. The SafeRef API function of the illustrated transaction server executive 80 has the following form (in the C programming language):

void*SafeRef ( REFIID riid, UNKNOWN*punk);

When the server application component is to pass a self-reference to the client program 134 or another server application component, the server application component 86 calls the SafeRef function first and passes the safe reference returned from the function. This is to ensure that all calls to the server application component are made through the transaction server executive. Otherwise, if the server application component passes a direct self reference, the reference would become invalid when the server application component is subsequently deactivated. The server application component specifies the interface that is to be passed to another program by its interface ID with the riid parameter. The pUnk parameter is a reference to an interface on the current instance of the server application component. The SafeRef API function returns a value as shown in the following table.

TABLE 4

SafeRef Return Values

| Value | Description |
|---|---|
| Non-Null | A safe reference to the interface specified in the riid parameter. |
| NULL | The server application component requested a safe reference on an object other than itself, or the interface specified by the riid parameter is not implemented by the server application component. |

The transaction server executive 80 also provides a GetObjectContext API function that the server application component 86 can use to obtain a reference to the IObjectContext interface on its component context object 136, which the server application component can then use to create another server application component that inherits its context (including the transaction property object). The GetObjectContext API function of the illustrated transaction server executive has the following form (in the C programming language).

HRESULT GetObjectContext
        (IObjectContext**ppInstanceContext);

The ppInstanceContext parameter is a storage location of the server application component where the GetObjectContext API function is to return the IObjectContext interface pointer. The GetObjectContext API function returns a value as shown in the following table.

TABLE 5

GetObjectContext Return Values

| Value | Description |
|---|---|
| S_OK | A reference to the IObjectContext interface of the server application component's component context object is returned in the ppInstanceContext parameter. |
| E_INVALIDARG | The argument passed in the ppInstanceContext parameter is invalid. |
| E_UNEXPECTED | An unexpected error occurred. |
| CONTEXT_E_NOCONTEXT | The server application component doesn't have a component context object, such as because the component was not created under the transaction server executive's control. |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer system having multiple users, a method of managing accessibility to program code of a component-based server application by the multiple users, the method comprising:

executing program code of a server application in a multi-tier architecture having a first tier of client application code for initiating processing by the server application in response to a user's inputs, a middle tier of object-oriented server application code, and a third tier of shared access data and code;

upon receiving a request from a client application process of the first tier's client application code to create a first object of the middle tier's object-oriented server application code, initiating an activity associated to the client application process and associating the first object in the activity;

associating any objects of the object-oriented server application code of the middle tier that are created directly or indirectly by the first object in the activity; and controlling flow of execution into the activity so as to limit access to the activity to the client application process, wherein objects of the middle tier's object-oriented server application code are limited to single user access.

2. The method of claim 1 further comprising:

further controlling the flow of execution in the activity to limit concurrent execution in the activity to a single logical thread of execution.

3. A computer-readable storage medium having stored thereon computer-executable program code operative, in a computer system having multiple users, to perform a method of managing accessibility to program code of a component-based server application by the multiple users, the method comprising the steps of:

executing program code of a server application in a multi-tier architecture having a first tier of client application code for initiating processing by the server application in response to a user's inputs, a middle tier of object-oriented server application code, and a third tier of shared access data and code; and upon receiving a request from a client application process of the first tier's client application code to create a first object of the middle tier's object-oriented server application code, initiating an activity associated to the client application process and associating the first object in the activity;

associating any objects of the object-oriented server application code of the middle tier that are created directly or indirectly by the first object in the activity; and controlling flow of execution into the activity so as to limit access to the activity to the client application process, wherein objects of the middle tier's object-oriented server application code are limited to single user access.

4. The computer-readable storage medium of claim 3 wherein the method further comprises further controlling the flow of execution in the activity to limit concurrent execution in the activity to a single logical thread of execution.

5. In a computer system having multiple users, a method of providing a simplified programming model for server applications, the method comprising:

executing server application code in a multi-tier server application architecture wherein object-oriented server application code is limited to execution in a first tier, and shared database resources and managing code executes in a second tier;

executing client application code in a third tier as separate client application processes per user, the client application code in a separate client application process providing a user interface to its respective user for initiating processing by the server application responsive to the user's input;

grouping created instances of objects of the object-oriented server application code on the first tier that are performing processing initiated by a client application process for its respective user into a collection pertaining to the user; and limiting access to the created instances of objects in the collection to only the client application process throughout such instances' lifetimes, wherein the objects in the first tier are limited to processing for a single one of the users.

6. A computer-readable storage medium having stored thereon computer-executable program code operative to perform a method in a computer system having multiple users of providing a simplified programming model for server applications, the method comprising:

executing server application code in a multi-tier server application architecture wherein object-oriented server application code is limited to execution in a first tier, and shared database resources and managing code executes in a second tier;

executing client application code in a third tier as separate client application processes per user, the client application code in a separate client application process providing a user interface to its respective user for initiating processing by the server application responsive to the user's input;

grouping created instances of objects of the object-oriented server application code on the first tier that are performing processing initiated by a client application process for its respective user into a collection pertaining to the user; and limiting access to the created instances of objects in the collection to only the client application process throughout such instances' lifetimes, wherein the objects in the first tier are limited to processing for a single one of the users.

7. A method of controlling execution in a single user object tier of a server application running on at least one server computer of a distributed computing network to limit individual server application object instances in such tier to processing for but a single user, the method comprising:

on each request from any of a plurality of user-specific client processes to instantiate an object in the single user object tier, creating an instance of the client process-requested object and associating a client identifier indicative of the requesting client process with that just-created instance;

on each request from any of a plurality of object instances in the single user object tier to instantiate an object in the single user object tier, creating an instance of the object-requested object and associating the requesting object instance's client identifier with that just-created instance; and restricting calls into any object instance in the single user object tier to those in a call sequence originating from the client process indicated by the client identifier associated with that object instance.

8. The method of claim 7 further comprising:

on each request from any of a plurality of user-specific client processes to instantiate an object in the single user object tier, creating an instance of the requested object and associating a client identifier indicative of the requesting client process with the created instance;

on a request from any object in the single user object tier to instantiate an object in the single user object tier, creating an instance of the requested object and associating a client identifier associated with the requesting object with the created instance; and restricting calls into any object in the single user object tier to the client process indicated by the client identifier associated with that object.

9. A computer-readable storage medium having stored thereon computer-executable program code operative to perform a method of controlling execution in a single user object tier of a server application running on at least one server computer of a distributed computing network to limit individual server application object instances in such tier to processing for but a single user, the method comprising:

on each request from any of a plurality of user-specific client processes to instantiate an object in the single user object tier, creating an instance of the client process-requested object and associating a client identifier indicative of the requesting client process with that just-created instance;

on each request from any of a plurality of object instances in the single user object tier to instantiate an object in the single user object tier, creating an instance of the object-requested object and associating the requesting object instance's client identifier with that just-created instance; and restricting calls into any object instance in the single user object tier to those in a call sequence originating from the client process indicated by the client identifier associated with that object instance.

10. The computer-readable storage medium of claim 9 wherein the method further comprises:

on each request from any of a plurality of user-specific client processes to instantiate an object in the single user object tier, creating an instance of the requested object and associating a client identifier indicative of the requesting client process with the created instance;

on a request from any object in the single user object tier to instantiate an object in the single user object tier, creating an instance of the requested object and associating a client identifier associated with the requesting object with the created instance; and restricting calls into any object in the single user object tier to the client process indicated by the client identifier associated with that object.

11. In a computer having multi-tasking computer-operating system code supporting execution of a plurality of threads, a method to implement concurrency isolation for preventing inadvertent parallelism in application components of an object-oriented code middle tier of a multi-tier client/server application architecture having a first tier of client program processes, the object-oriented code middle tier, and a third tier of shared access data and code, the method comprising:

grouping a subset of the application components of the second tier that are created directly or indirectly by an initiating client process to perform processing work for the initiating client process into an activity; and controlling execution flow into the subset of application components on the middle tier that are grouped in the activity such that concurrent execution in said subset is restricted to a single logical thread of execution originating with the initiating client process.

12. The method of claim 11 further comprising:

when a client program process of the first tier requests creation of a first application component instance of the middle tier, creating such first instance and associating therewith an activity identifier designating the activity for grouping the subset of the application components of the middle tier;

when an application component of the middle tier having the activity identifier associated therewith requests creation of an additional application component instance of the middle tier, creating such additional instance and associating therewith the activity identifier so as to group such additional instance in the activity; and preventing entry into the subset of application components associated with the activity identifier of any more threads than the single logical thread of execution.

13. A computer-readable storage medium having stored thereon computer-executable program code operative in a computer having multi-tasking computer-operating system code supporting execution of a plurality of threads, to perform a method to implement concurrency isolation for preventing inadvertent parallelism in application components of an object-oriented code middle tier of a multi-tier client/server application architecture having a first tier of client program processes, the object-oriented code middle tier, and a third tier of shared access data and code, the method comprising:

grouping a subset of the application components of the second tier that are created directly or indirectly by an initiating client process to perform processing work for the initiating client process into an activity; and controlling execution flow into the subset of application components on the middle tier that are grouped in the activity such that concurrent execution in said subset is restricted to a single logical thread of execution originating with the initiating client process.

14. In a distributed computer system having multiple users, a computer operating environment for providing single user server application components, the computer operating environment comprising:

connectivity code for receiving a request of a client application process to create a component of a component-based server application;

component creation code for creating the client-requested component in an activity pertaining to the client application process in response to the client application process'request, and for creating additional components of the component-based server application in the activity in response to requests of any component in the activity to create the additional component; and execution flow control code for restricting access to components in the activity to the client application process, wherein components of the component-based server application are limited to single user access.

15. The computer operating environment of claim 14 further comprising:

data access code for providing shared access by the components of the component-based server application in different activities to a relational database.

16. The computer operating environment of claim 14 wherein execution flow control code further operates to control the flow of concurrent execution in the activity to limit concurrent execution in the activity to a single logical thread of execution.

17. A computer-readable storage medium having computer-executable program code stored thereon of a server application for execution on at least one server computer in a distributed computer network, the server application accessed by multiple users at client stations in the distributed computer network, the server application having a multi-tier architecture comprising:

a single user access tier of object-oriented server application code for execution in a run-time environment operative to group object instances of the object-oriented server application code that are created directly or indirectly at request of a client process run at a client station of a single one of the users and to limit access to individual of said group of object instances of the object-oriented server application code to access from the client process of the single one of the users throughout the respective object instance's lifetime; and a shared access tier of data and code to which object instances of the single user access tier accessible to different users have shared access.

18. The computer-readable storage medium of claim 1 wherein the multi-tier architecture further comprises a client tier of client application code for initiating processing by the object-oriented server application code of the single user access tier responsive to user inputs.

* * * * *